United States Patent [19]

Oohori et al.

[11] 4,247,153
[45] Jan. 27, 1981

[54] DEVICE FOR CONTROLLING HYDRAULIC PRESSURE IN HYDRAULIC BRAKE SYSTEM OF VEHICLE

[75] Inventors: Harumi Oohori, Toyota; Akira Shirai, Toyoake; Hiroshi Uemura, Okazaki; Tomoyuki Nogami, Toyota, all of Japan

[73] Assignee: Toyota Jidosha Kogyo Kabushiki Kaisha, Toyota, Japan

[21] Appl. No.: 972,716

[22] Filed: Dec. 26, 1978

[30] Foreign Application Priority Data

Jun. 19, 1978 [JP] Japan ................ 53-74045

[51] Int. Cl.³ .............................................. B60T 8/14
[52] U.S. Cl. .................................. 303/6 C; 188/349; 303/24 F
[58] Field of Search ............ 188/349; 303/6 C, 24 A, 303/24 C, 24 F

[56] References Cited

U.S. PATENT DOCUMENTS

| 4,070,067 | 1/1978 | Katoh et al. | 303/24 C X |
| 4,072,363 | 2/1978 | Nogami | 303/24 C |
| 4,080,006 | 3/1978 | Nogami et al. | 303/24 F |

FOREIGN PATENT DOCUMENTS 1387022  12/1968  France .................. 303/24 A

Primary Examiner—Douglas C. Butler
Attorney, Agent, or Firm—Cushman, Darby & Cushman

[57] ABSTRACT

A device for controlling the hydraulic pressure in the hydraulic braking system of a vehicle, in such a manner that the hydraulic pressure in the rear wheel cylinder is increased at a rate smaller than that in the front wheel cylinder, after a predetermined level of deceleration of the vehicle is reached. The device has a valve chamber in which a ball valve is disposed movably. A differential piston has two opposing pressure receiving surfaces of different areas exposed in the inlet and outlet chambers. The arrangement is such that, when the predetermined level of deceleration is reached, the ball valve is moved due to its inertia to a position for interrupting the communication between the inlet and the outlet chambers. Once the communication between two chambers is interrupted, the pressure in the master cylinder is transmitted across the differential piston. The transmitted pressure is lowered at a rate corresponding to the ratio of the areas of pressure receiving surfaces of the differential piston. The movement of the ball valve is freed from the dynamic pressure of the braking fluid and from the change in viscosity of the same, thanks to a specific arrangement of a restriction passage through which the valve chamber communicates the inlet chamber.

1 Claim, 6 Drawing Figures

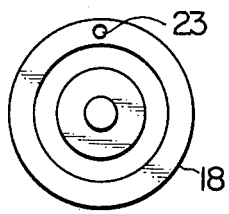
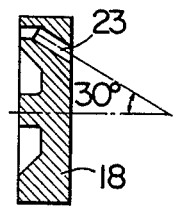
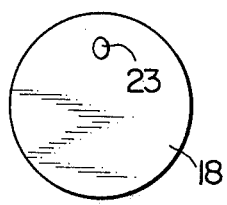
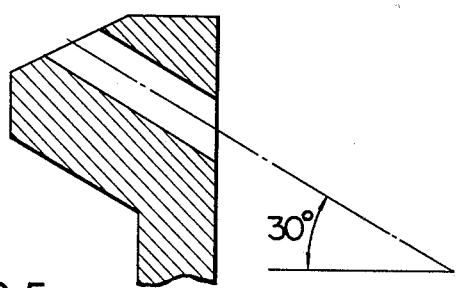
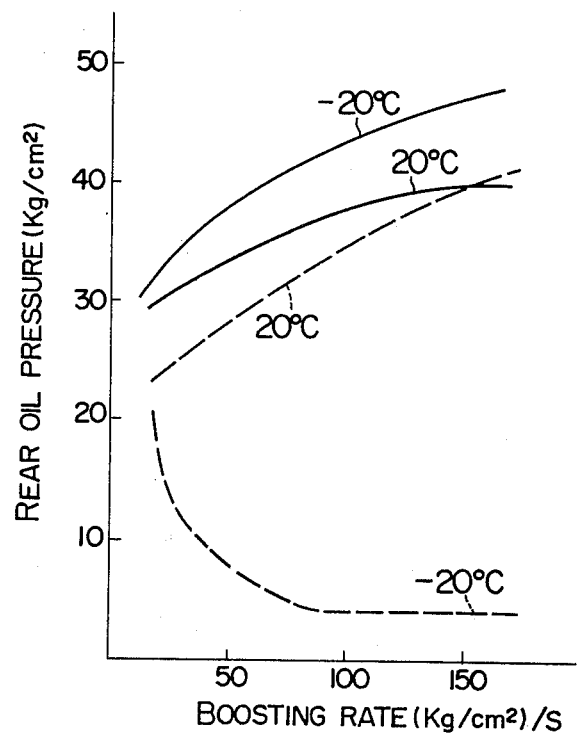

DEVICE FOR CONTROLLING HYDRAULIC PRESSURE IN HYDRAULIC BRAKE SYSTEM OF VEHICLE

BACKGROUND OF THE INVENTION

The present invention relates to a hydraulic pressure controlling device for use in hydraulic brake systems of vehicles and, more particularly, to an improvement in deceleration sensing type braking hydraulic pressure controlling device which is disposed in a hydraulic circuit communicating a master cylinder and a rear wheel cylinder and adapted to control the hydraulic pressure in the rear wheel cylinder, upon sensing the deceleration of the vehicle when the latter is braked.

As a matter of theory, it has been known to those skilled in the art that, in order to obtain a stable braking through equalizing the decelerations of the front and rear wheels, it is necessary to gradually lower the rate of increase of the hydraulic pressure transmitted from the master cylinder to the rear wheel cylinder as compared with that for the front rear cylinder. For achieving such a hydraulic pressure control as faithfully as possible to the theory, a brake system incorporating a deceleration sensing type braking hydraulic pressure control valve, which is disposed in the hydraulic circuit between the master cylinder and the rear wheel cylinder, has been widely used.

This deceleration sensing type braking hydraulic pressure controlling valve has a valve chamber communicating the master cylinder and the rear wheel cylinder, a ball valve accommodated by the valve chamber in a floating manner, and a differential piston which is subjected to the pressures of both of the master cylinder and the rear wheel cylinder. In the braking, as the deceleration of the vehicle reaches a predetermined level, the ball valve is moved due to the inertia in the direction of movement of the vehicle, so as to close the valve opening to break the communication of the master cylinder and the rear wheel cylinder with each other. Once the rear wheel cylinder is isolated from the master cylinder, the pressure in the master cylinder is transmitted to the rear wheel cylinder through the action of the differential valve, so that the rate of pressure increase in the rear wheel cylinder is made smaller than that in the master cylinder.

Thus, the pressure in the rear wheel cylinder is increased at the same rate as the front wheel cylinder which is in direct communication with the master cylinder, before the valve opening is closed by the ball valve. However, after the valve opening is closed by the ball valve, the pressure in the rear wheel cylinder increases at a rate which is smaller than that in the front wheel cylinder. Consequently, the change of the braking force on the rear wheels is represented by two linear curves having different gradients and merging in each other at the instant at which the valve opening is closed by the ball valve. These linear curves approximates the theoretically required braking force distribution to some extent.

This deceleration sensing type braking hydraulic pressure controlling device, however, poses the following disadvantages.

Namely, the ball valve which is disposed in the flow passage of the braking fluid forwarded by the master cylinder is inevitably subjected to the dynamic pressure exerted by the flow of the braking fluid. This dynamic pressure inconveniently tends to displace the ball valve in the direction to close the valve opening. It is extremely difficult to make the ball valve standstill against this dynamic pressure.

In addition, the variation of the viscosity of the braking fluid attributable to the change of the working temperature causes a considerably large change in the dynamic pressure and, therefore, prevents the braking force distribution from approximating the theoretically required one.

SUMMARY OF THE INVENTION

It is therefore an object of the invention to provide a braking hydraulic pressure controlling device for vehicles, capable of avoiding the undesirable too early functioning of the ball valve due to the dynamic pressure of the braking fluid coming from the master cylinder, so as to free the ball valve from the affect of the dynamic pressure over a wide range of temperature, thereby to ensure a stable braking effect of the braking system.

To this end, according to the invention, there is provided a hydraulic pressure controlling device of a hydraulic braking system of a vehicle, the device having an inlet chamber and an outlet chamber which are in communication with a master cylinder and a rear wheel cylinder of the braking system, respectively, a valve chamber in one hand communicating the inlet chamber through a depart plate and on the other hand communicating the outlet chamber through a valve port, a ball valve disposed in the valve chamber and adapted to close the valve port due to its inertia when the deceleration of the vehicle has reached a predetermined level, and a differential piston having pressure receiving surfaces exposed in the inlet and the outlet chambers, respectively, characterized by comprising a restriction passage formed in the upper portion of the depart plate disposed at the upstream side of the valve chamber, the restriction passage including a small diameter bore having an axis extending in parallel with an axis line passing through the center of said ball valve and the center of the valve port, and a large diameter bore connected to the upstream side end of the small diameter bore.

Consequently, the movement of the ball valve is freed from the dynamic pressure imparted by the flow of the braking fluid coming into the valve chamber through the restriction passage, and also from the influence of the change in the viscosity of the oil attributable to the temperature change.

The above and other objects, as well as advantageous features of the invention will become more clear from the following description of the preferred embodiments taken in conjunction with the accompanying drawings.

BRIEF DESCRIPTION OF THE DRAWINGS

FIG. 2 is a front elevational view of a depart plate incorporated in the device as shown in FIG. 1, FIG. 3 is a longitudinal sectional view of the depart plate as shown in FIG. 2, FIG. 4 is a rear elevational view of the depart plate as shown in FIGS. 2 and 3, FIG. 5 is a graphical representation of the performance of the device of the invention in comparison with another device, and FIG. 6 is a sectional view of a reference orifice as used in obtaining the performance as shown in FIG. 5.

DESCRIPTION OF THE PREFERRED EMBODIMENT

Figure 1:
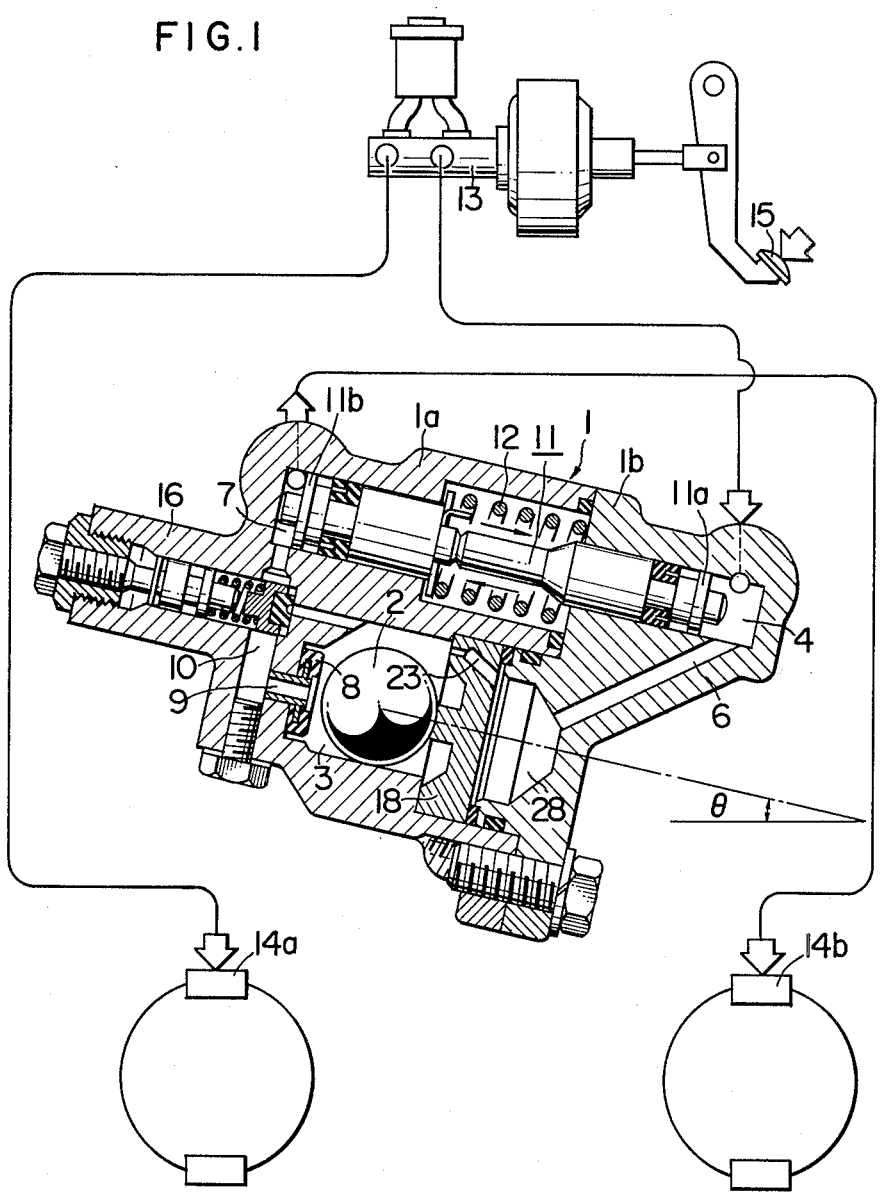
FIG. 1 is a schematic sectional view of a braking hydraulic pressure controlling device for vehicle in accordance with the invention.

Referring first to FIG. 1 showing a circuit for the braking fluid, a valve housing 1 is constituted by a main body 1a and an end cover 1b unitarily secured to the main body 1a. The valve housing 1 defines at its lower portion a valve chamber 3 which accommodates a ball valve 2 of 19.05 mm dia. The valve chamber 3 is large enough to afford a stroke of 2.25 mm for the ball valve 2.

The valve chamber 3 is in one hand in communication with a master cylinder 13 of the braking system through an inlet chamber 4, passage 6, vacant space 28 and an orifice or restriction passage 23 formed in a depart plate. The valve chamber 3 on the other hand communicates a rear wheel cylinder 14b of the brake system through a valve port 9 around which a valve seat 8 is formed, passage 10 and an outlet chamber 7.

A differential piston generally designated at a numeral 11 is disposed in the upper portion of the valve housing 1. The differential piston 11 has a small-diameter piston 11a having one end exposed in the inlet chamber 4 so as to receive the hydraulic pressure delivered by the master cylinder 13. The differential piston further has a large-diameter piston 11b. The end of the large-diameter piston 11b is exposed in the outlet chamber 7, so as to receive the hydraulic pressure applied to the rear wheel cylinder 14b. A spring 12 is provided to bias the differential piston normally toward the outlet chamber 7. In FIG. 1, reference numerals 14a, 15 and 16 denote, respectively, a front wheel cylinder, a brake pedal and a by-pass bell portion. The front wheel cylinder 14a is in direct communication with the master cylinder.

FIGS. 2, 3 and 4 are a front elevational view, longitudinal sectional view and a rear elevational view of the depart plate 18 having the restriction passage 23. The depart plate 18 generally has a disc-like shape provided at its front center portion with a surface for receiving the ball valve 2.

The central axis of the depart plate 18 passes the center of the ball valve 2 and then the center of the valve port 9 which is adapted to be closed by the ball valve 2. The valve housing 1 is mounted at an inclination that the axis of the depart plate 18 makes an angle $\theta$ to the horizontal plane.

As will be seen from FIG. 1, the restriction passage 23 formed in the depart plate 18 has a small diameter bore at its one end closer to the ball valve 2. This small diameter bore has a diameter of 2 mm and a length of 5.5 mm, and extends in parallel with the axis of the depart plate at a distance of 12.95 mm from the latter. The opposite end of the restriction passage 23, i.e. the end portion thereof closer to the vacant space 28, forms a bore of a large diameter, which is in this case 3 mm. This large diameter bore has an axis which makes an angle of 30° to the axis of the smaller bore, so that it gradually comes closer to the axis of the depart plate.

This restriction passage 23 is provided for diminishing the dynamic pressure exerted by the flow of the braking fluid as much as possible, and to ensure an appropriate braking effort to the rear brake even when the viscosity of the braking fluid is changed as a result of a change in the temperature.

Thus, the small diameter bore of the restriction passage has a substantial significance in determining the direction of the braking fluid flowing through the restriction passage. The adverse affect or inconvenience caused by the change of viscosity due to the temperature change can be diminished by so arranging the small bore as to avoid the application of the dynamic pressure to the ball valve 2. The large diameter bore in the restriction passage 23 is provided to minimize the affect on the flowing characteristics caused by the change in the viscosity.

According to the invention, it is critical and essential that the restriction passage 23 is formed in the uppermost portion of the depart plate 18. Namely, the distance between the restriction passage 23 and the valve port 9 is maximized, so that the ball valve 2 is freed as much as possible from the flow of the braking fluid.

FIG. 5 shows, by way of reference, the result of a test conducted to examine the advantage of the small diameter bore formed in the restriction passage. The full-line curves show the characteristics of the device in accordance with the invention, while the characteristic as shown by broken-line curves were obtained by the use of a depart plate as shown in FIG. 6 having no small diameter bore.

It will be seen from FIG. 5 that the small bore formed in the depart plate is quite effective in diminishing the adverse affect caused by the change in the temperature of the braking fluid.

A description will be made hereinafter as to the operation of the braking hydraulic pressure controlling device for vehicles in accordance with the invention.

At the initial stage of the braking operation, the ball valve 2 in the valve chamber 3 is located at the hindmost position apart from the valve port 9 so as to keep the latter opened. Therefore, the hydraulic pressure in the rear wheel cylinder 14b is gradually increased as the pressure in the master cylinder 13 increases. Since the inlet chamber 4 and the outlet chamber 7 are held in this state at an equal pressure, the piston 11 is displaced toward the inlet chamber, overcoming the biasing force of the spring 12, due to the differential of the effective pressure-receiving areas of the small and large diameter pistons 11a, 11b. As the pressure in the rear wheel cylinder 14b is gradually increased, the vehicle is decelerated correspondingly. Then, when the deceleration reaches a predetermined level, the ball valve is moved to the left on the drawings, i.e. in the direction of movement of the vehicle, due to the inertia, so as to close the valve port 9, thereby to interrupt the communication between the master cylinder 13 and the rear wheel cylinder 14b. Thanks to the provision of the restriction passage 23, this interruption is made adequately, in a manner less affected by the change in the temperature of the braking fluid.

After the communication is interrupted, the pressure rise in the master cylinder 13 can no more be transmitted directly to the rear wheel cylinder 14b. In this state, however, the differential piston 11 is urged toward the outlet chamber 7, because the pressure of the braking fluid becomes higher at the inlet chamber 4 than at the outlet chamber 7, as the pressure in the master cylinder 13 continues to rise even after the interruption of the communication. As a result, the braking fluid confined at the downstream side of the ball valve 2, i.e. in the line between the ball valve 2 and the rear wheel cylinder 14b, is compressed by the large-diameter piston 11b of the differential piston 11.

Consequently, after the valve port 9 is closed by the ball valve 2, the rise in the pressure in the master cylinder 13 is indirectly transmitted to the rear wheel cylinder 14b across the differential piston 11. The pressure transmitted across the differential piston 11 is reduced at a rate corresponding to the ratio of effective pressure receiving surface of the small-diameter piston to that of the large diameter piston.

Meanwhile, the rise in pressure in the master cylinder is directly and continuously transmitted to the front wheel cylinder 14a. Thus, before the valve port 9 is closed by the ball valve 2, the pressure in the rear wheel cylinder 14b is increased at the same rate as that in the front wheel cylinder 14a. However, after the valve port 9 is closed by the ball valve 2, the pressure in the rear wheel cylinder 14b is increased at a rate smaller than that in the front wheel cylinder 14a.

As will be seen from the foregoing description, according to the invention, the ball valve is conveniently freed from the influence of the dynamic pressure of the flow of the braking fluid caused by the pressure increase in the master cylinder, and also from the influence of the change in the viscosity of the braking fluid attributable to the change in the temperature.

Further, the restriction passage for controlling the flow of the braking fluid entering the valve chamber is formed in the uppermost portion of the depart plate, so that it may be located at the uppermost portion of the valve chamber. In addition, the restriction passage consists simply of a small diameter bore adjacent to the valve chamber and having an axis extending in parallel with the axis line passing through the centers of the ball valve and the valve port, and a large diameter bore connected to the upstream side end of the small diameter bore. Consequently, according to the invention, there is provided a braking hydraulic pressure controlling device for vehicles, provided with a restriction passage having no movable part and occupying only small space and, accordingly, highly relieable, thereby to ensure a stable and safe braking operation of the braking system.

What is claimed is:

1. A hydraulic pressure controlling device of a hydraulic braking system of a vehicle, said device having an inlet chamber and an outlet chamber which are in communication with a master cylinder and a rear wheel cylinder of said hydraulic braking system, respectively, a valve chamber on one hand communicating with said inlet chamber through a depart plate and on the other hand communicating with said outlet chamber through a valve port, a ball valve disposed in said valve chamber and adapted to close said valve port due to its inertia when the deceleration of said vehicle has reached a predetermined level, and a differential piston having pressure receiving surfaces exposed in said inlet and outlet chambers, respectively, wherein the improvement resides in said depart plate being stationary under all fluid conditions and facing a vacant space at its upstream side and said valve chamber at its downstream side, said depart plate including a restriction passage formed in the upper portion of said depart plate and disposed in a position so as to communicate at its downstream end with an upper portion of said valve chamber and at its upstream end with said vacant space, said restriction passage including: a small diameter bore located at a level higher than said ball valve and having an axis extending in parallel with an axis line passing through the center of said ball valve and the center of said valve port, and a large diameter bore connected to the upstream end of said small diameter bore and inclined with respect to the axis of said small diameter bore in a manner so as to be directed toward a center portion of the vacant space.

* * * * *